United States Patent
Stählin

(10) Patent No.: US 10,513,216 B2
(45) Date of Patent: Dec. 24, 2019

(54) METHOD FOR CONTROLLING THE LIGHT DISTRIBUTION OF VEHICLE HEADLIGHTS AND VEHICLE

(71) Applicant: Continental Teves AG & Co. oHG, Frankfurt (DE)

(72) Inventor: Ulrich Stählin, Eschborn (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 354 days.

(21) Appl. No.: 15/502,400

(22) PCT Filed: Sep. 22, 2015

(86) PCT No.: PCT/EP2015/071753
§ 371 (c)(1),
(2) Date: Feb. 7, 2017

(87) PCT Pub. No.: WO2016/046209
PCT Pub. Date: Mar. 31, 2016

(65) Prior Publication Data
US 2017/0225608 A1    Aug. 10, 2017

(30) Foreign Application Priority Data
Sep. 24, 2014 (DE) .......... 10 2014 219 323

(51) Int. Cl.
*B60Q 1/08* (2006.01)
*B60Q 1/12* (2006.01)
(Continued)

(52) U.S. Cl.
CPC .............. *B60Q 1/085* (2013.01); *B60Q 1/10* (2013.01); *B60Q 1/12* (2013.01); *B60Q 1/14* (2013.01);
(Continued)

(58) Field of Classification Search
CPC . B60Q 1/085; B60Q 1/10; B60Q 1/12; B60Q 1/14; B60Q 1/143; B60Q 1/16
(Continued)

(56) References Cited

U.S. PATENT DOCUMENTS

2010/0267379 A1* 10/2010 Stahlin ............ G08G 1/096716
455/426.1
2011/0098877 A1* 4/2011 Stahlin ................. G08G 1/161
701/31.4
(Continued)

FOREIGN PATENT DOCUMENTS

DE    19758155    7/1999
DE    19948733    4/2001
(Continued)

OTHER PUBLICATIONS

International Preliminary Report on Patentability and Written Opinion for International Application No. PCT/EP2015/071753, dated Mar. 28, 2017, including English translation, 12 pages.
(Continued)

*Primary Examiner* — Bryon T Gyllstrom
(74) *Attorney, Agent, or Firm* — RatnerPrestia

(57) ABSTRACT

A method for controlling the light distribution of vehicle headlights using vehicle-to-X communication, as well as a vehicle having an electronic circuit that executes such a method. The method can be used to implement a variable light distribution of vehicle headlights without cameras and digital maps.

20 Claims, 2 Drawing Sheets

(51) Int. Cl.
*B60Q 1/14* (2006.01)
*B60Q 1/10* (2006.01)
*B60Q 1/16* (2006.01)

(52) U.S. Cl.
CPC .............. *B60Q 1/143* (2013.01); *B60Q 1/16* (2013.01); *B60Q 2300/11* (2013.01); *B60Q 2300/12* (2013.01); *B60Q 2300/322* (2013.01); *B60Q 2300/41* (2013.01); *B60Q 2300/42* (2013.01); *B60Q 2300/47* (2013.01)

(58) Field of Classification Search
USPC ........................................................ 362/466
See application file for complete search history.

(56) References Cited

U.S. PATENT DOCUMENTS

| | | | | |
|---|---|---|---|---|
| 2011/0098898 | A1* | 4/2011 | Stahlin | G08G 1/095 701/70 |
| 2012/0203427 | A1* | 8/2012 | Ehlgen | B60Q 1/085 701/36 |
| 2012/0220231 | A1* | 8/2012 | Stahlin | G01S 5/0072 455/41.2 |
| 2013/0051042 | A1* | 2/2013 | Nordbruch | B60Q 1/085 362/466 |
| 2013/0058116 | A1* | 3/2013 | Galbas | B60Q 1/085 362/512 |
| 2014/0177243 | A1* | 6/2014 | Noh | B60Q 1/143 362/466 |
| 2014/0246975 | A1* | 9/2014 | Futamura | B60Q 1/143 315/82 |
| 2014/0334168 | A1* | 11/2014 | Ehlgen | B60Q 1/085 362/466 |
| 2015/0023668 | A1* | 1/2015 | Spaulding | H04B 10/1129 398/106 |
| 2015/0025709 | A1* | 1/2015 | Spaulding | G08G 1/163 701/2 |
| 2017/0008444 | A1* | 1/2017 | Bopp | B60Q 1/143 |

FOREIGN PATENT DOCUMENTS

| | | |
|---|---|---|
| DE | 10241133 | 3/2004 |
| DE | 102006004130 | 8/2007 |
| DE | 102010007866 | 8/2011 |
| DE | 102011076644 | 11/2012 |
| DE | 102012009908 | 1/2013 |
| DE | 102012018488 | 3/2014 |
| WO | 2010133586 | 11/2010 |

OTHER PUBLICATIONS

International Search Report and Written Opinion of the International Searching Authority for International Application No. PCT/EP2015/071753, dated Dec. 14, 2015, 8 pages.
German Search Report for German Application No. 10 2014 219 323.0, dated Jul. 6, 2015 with partial translation, 9 pages.

* cited by examiner

METHOD FOR CONTROLLING THE LIGHT DISTRIBUTION OF VEHICLE HEADLIGHTS AND VEHICLE

CROSS REFERENCE TO RELATED APPLICATIONS

This application is the U.S. National Phase Application of PCT International Application No. PCT/EP2015/071753 filed Sep. 22, 2015, which claims priority to German Patent Application No. 10 2014 219 323.0, filed Sep. 24, 2014, the contents of such applications being incorporated by reference herein.

FIELD OF THE INVENTION

The invention relates to a method for controlling the light distribution of vehicle headlights and to a vehicle having an electronic circuit configured to execute such a method.

BACKGROUND OF THE INVENTION

In the past, vehicle headlights were usually fixed. This means that they could only shine in the direction predetermined by the orientation of the vehicle. Such a rigid light distribution does not yield ideal results when the road is winding or when the vehicle is turning, since relevant areas of the route are not well illuminated. Therefore, adaptive headlights were initially introduced that dynamically adjust the lighting direction of the vehicle headlights, for example based on the steering angle or map data that provide the course of the route traveled. These headlights allow improved adjustment of the light distribution of the vehicle headlights to actual requirements, especially when taking bends and turning corners.

For normal operation, such as in developed areas or outside of developed areas with oncoming or preceding traffic, vehicle headlights are usually operated at low beam. Typically, the functionality of high beam lighting is provided, which has a considerably longer range and better illuminates the route to be traveled. In this way, a driver can better identify the course of the road and any obstacles. However, since high beam headlights would dazzle oncoming or preceding traffic, they can only be used if there are no other road users within the range of the high beam headlights.

High beam headlights were typically manually controlled in the past; the driver could switch them to high or low beam using a lever or switch. More recent systems can automatically control high beam headlights based on camera data. For example, oncoming or preceding road users are detected by their headlights or tail lights, and high beam headlights are switched on or off depending on whether such road users are present or not. This relieves the driver, avoids dazzling other road users due to late switching to low beam, and allows fast switching to high beam in situations in which there are no other road users in the illumination range of the high beam headlights. Such systems for automatic switching to high or low beam are also called high beam assist.

Another improvement of the concept of high beam assist are the new systems in which the light distribution of the headlights is adapted dynamically. Oncoming or preceding vehicles can be detected by their headlights or tail lights, but the headlights can also be switched to high beam if there are such vehicles in the illumination range of the high beam headlights. In this case, the headlight range can be adjusted automatically so that the headlights only illuminate an area in which other road users are not dazzled. It is also possible to take a dynamically adjustable tunnel out of a widely illuminating high beam light cone, which is selected such that an oncoming or preceding vehicle is exactly located in this tunnel. This prevents the system from dazzling the driver of that vehicle, while still providing the best possible illumination range of the vehicle headlights.

It is a disadvantage of existing systems for the light distribution of vehicle headlights that these systems need additional components such as a camera or a digital road map. The need for such comparatively expensive components can hinder the introduction of high beam assist systems, which provide a considerable increase in safety, especially in vehicles of the lower price segment.

SUMMARY OF THE INVENTION

An aspect of the invention provides a method for controlling the light distribution of vehicle headlights that has lower or other requirements for additional components. A further aspect of the invention provides a vehicle having an electronic circuit that is configured for executing such a method.

An aspect of the invention relates to a method for controlling the light distribution of vehicle headlights, comprising the following steps:

Receiving data from a vehicle-to-X communication, and calculating the light distribution based at least on this data.

The use of data from a vehicle-to-X communication according to the invention eliminates the need to use cameras and/or digital maps. This considerably lowers the costs for implementing the high beam assist function or a variable light distribution function in general. All that is typically needed is a vehicle-to-X communication module, wherein such a module provides many other advantages, particularly with respect to vehicle safety. It can therefore be expected that such vehicle-to-X communication modules will also be implemented more frequently in vehicles of the lower price segments in the future. Unlike such modules, digital maps are components that provide convenience features which do not provide such a clear increase in safety and are often replaced by small portable navigation devices or mobile phones and respective software, particularly in vehicles of lower-priced segments.

The concept of vehicle-to-X communication includes in particular a vehicle-to-vehicle communication and a vehicle-to-infrastructure communication. Vehicle-to-vehicle communication allows the exchange of data such as speed, route, lane change intentions, or information about broken down vehicles, or emergency and rescue vehicles between vehicles. This provides considerably more comprehensive information to road users about the traffic than would be possible in the classic field of vision of the driver including the field of vision added by the rearview mirror. Vehicle-to-infrastructure communication means in particular the exchange of data between vehicles and facilities such as traffic control systems, electronic road signs, or traffic information systems. For example, a variable speed limit can be communicated to vehicles that are in the section to which the speed limit applies via vehicle-to-infrastructure communication by means of wireless data transfer. The reliability of such a system is typically better than the currently common detection of road signs using cameras installed in the vehicles.

Vehicle-to-X communication modules typically have an integrated satellite navigation module or are coupled to such a satellite navigation module that is present in the vehicle. A digital map, however, is not required for the typical functionality of vehicle-to-X communication.

It is due in particular to the high functionality of vehicle-to-X communication, which provides a considerable increase in safety, that it can be expected to spread quickly across all price classes of vehicles when it is introduced to the mass market. The method according to the invention thus enhances the spread of vehicle headlight systems with dynamic light distribution considerably, which is currently prevented by expensive components such as cameras or digital maps. This results in a considerable increase in traffic safety overall.

According to one embodiment, light distribution includes a light range of the vehicle headlights. This can mean, for example, that the vehicle headlights are configured to emit the light at an adjustable angle to the road. If traffic is dense, a beam angle can be selected that matches that of the classic low beam headlight. This is the minimum light range, which a vehicle operated at night or in other situations of poor visibility should always have. If, for example, a preceding vehicle is a long distance away and there are no oncoming vehicles, the light range can be increased by selecting a flatter angle. The light range can be dynamically adjusted to the distance of the preceding vehicle. Likewise, the light range can be adjusted to oncoming vehicles to avoid dazzling their drivers. It is understood that the light range can be set differently in the sectors.

According to another embodiment, light distribution includes a lighting direction or multiple lighting directions of the vehicle headlights. Using just one lighting direction is particularly appropriate if the vehicle headlights basically emit a homogeneous beam of light in the horizontal direction, wherein they can change the angle of this beam of light. For example, the beam of light can be shifted farther to the left or to the right. Using several lighting directions is particularly appropriate if the vehicle headlights are configured to interrupt the beam of light and, for example, form a tunnel for preceding or oncoming vehicles. In this case, each part of the beam of light has its own lighting direction or can be defined by multiple lighting directions, each of which horizontally limits the beam of light.

In one aspect of the invention this data comes at least in part from other vehicles. This is particularly made possible by vehicle-to-vehicle communication. Furthermore, such data preferably contain at least partial information about a respective route that is traveled. This allows conclusions to be made with respect to the routes of other vehicles by the receiving vehicle in which the method according to an aspect of the invention is implemented. This information about a respective route traveled can also be in the form of so-called traces, that is, a series of locations of the vehicle at fixed time intervals.

In one aspect of the invention the method further comprises a step of calculating a route based on the information about respective routes traveled by other vehicles, wherein the calculated route is used in the step of calculating the light distribution. This can mean, for example, that information about routes traveled by other vehicles is used to calculate in advance the route that one's own vehicle will travel. Such information can be particularly advantageously used when controlling the light distribution, so that, for example, the illumination of bends can be improved. It is not required in this context that a digital map is available in the vehicle.

The data that comes from other vehicles preferably includes at least partially periodic signals indicating the respective current position of the other vehicle. Such signals can also be called periodic beacons. In Europe, such signals can be CAM messages, for example. In the United States, these can be BSM messages (Basic Safety Messages). Such periodic signals are frequently sent out anyway by vehicles that take part in vehicle-to-X communication, and they can be used in an advantageous manner for controlling the light distribution of vehicle headlights using this implementation of the method according to the invention.

In one aspect of the invention the method comprises a step of calculating a route based on these periodic signals, wherein the calculated route is used in the step of calculating the light distribution. In particular, information about the respective current position of other vehicles can be used to calculate in advance a route which one's own vehicle will travel in the future. For example, the positions of other vehicles can be lined up, and a suitable lineup of the positions received allows a good estimate of the route to be traveled. Such a procedure can resemble the electronic modeling of an ant trail.

The method may further include the step of detecting oncoming or preceding vehicles using the periodic signals, wherein the positions and/or routes of oncoming or preceding vehicles are used in the step of calculating light distribution. In this way, vehicle-to-X communication cannot just be used to calculate a route, but it can also be used to take oncoming or preceding vehicles into account, without requiring a camera that has, until now, been customarily used for this. This allows improved control of the light distribution, which can for example specifically take oncoming or preceding vehicles out of the light distribution to avoid dazzling their drivers, yet at the same time provide the best possible illumination range.

The method may also include a step of adjusting the light distribution to a standard value in the case in which no data from vehicle-to-X communication or an insufficient amount of data from vehicle-to-X communication is received within a predetermined period of time. Such a standard value can for example correspond to the classic low beam light. If no data are received from vehicle-to-X communication, this can indicate that vehicle-to-X communication is disturbed or that no vehicles equipped with vehicle-to-X communication are within radio range. In this case, it is typically not possible to set a light distribution that goes beyond regular low beam light, since the risk of dazzling other road users would be too great. If only insufficient data is received from vehicle-to-X communication, which can occur if the amount of incoming data is below a specific threshold value, this can indicate that traffic volume on the route is rather low. In this case, it can be difficult or impossible to calculate the route in advance as there is not enough data available. It is understood that the vehicle can resort to classic methods of controlling the light distribution in this case, for example by setting lighting directions based on the steering angle or manual control of the high beam function by the driver.

According to one embodiment, the method according to an aspect of the invention is performed without using camera data and/or without using map data. This eliminates the need for expensive cameras or electronic maps. It also allows implementation of the method according to the invention in vehicles of the lower price segments.

It is understood however, that components such as cameras, separate satellite navigation systems, or digital maps can be additionally employing for using the method according to the invention, if such components are available. In other words, control of light distribution can be based both on vehicle-to-X communication and on data received from cameras, satellite navigation systems, and/or digital maps.

According to one embodiment, calculating the light distribution is additionally based on camera data and/or map data.

In one aspect of the invention the method is performed in an electronic circuit, such as a high beam assist's circuit. Such an electronic circuit can, for example, be a microprocessor, a microcontroller, a freely programmable computer, an application-specific integrated circuit (ASIC), or another similar element. In one aspect of the invention the electronic circuit includes processor means and memory means, wherein program code is stored in said memory means that, if executed, causes said processor means to behave in a defined manner. For example, they can execute the method according to the invention in accordance with one of the variants and embodiments described. It is understood that the invention also relates to such an electronic circuit.

An aspect of the invention further relates to a vehicle, comprising:

Vehicle-to-X communication means,
an electronic circuit configured to execute a method according to the invention, as well as
at least one headlight whose light distribution is controlled by the electronic circuit.

By means of the vehicle according to an aspect of the invention, the advantages of the method according to the invention for a vehicle as described above can be made useful. All variants and embodiments described above can be used to perform the method. The advantages explained apply accordingly.

The vehicle-to-X communication means can in particular be configured as an interface or module for wireless communication with other vehicles and/or with infrastructure.

It is understood that four-wheel vehicles typically have two or four headlights that are controlled using the method according to the invention. They are preferably controlled together. Other vehicles, such as two-wheel vehicles or even rail-bound vehicles, typically have just one headlight or three headlights whose light distribution can also be controlled using the method according to the invention. In addition, other lighting means such as daytime running lights, turn signals, side lamps, accent lights, static cornering lamps, or fog lights can be provided and also controlled using the method according to the invention. It should be understood that any number of headlights can be controlled using the method according to the invention.

BRIEF DESCRIPTION OF THE DRAWINGS

Other features and advantages of the invention will become apparent to a person skilled in the art when reading the following description of embodiments with reference to the enclosed drawing. Wherein.

DETAILED DESCRIPTION OF THE PREFERRED EMBODIMENTS

Figure 1:
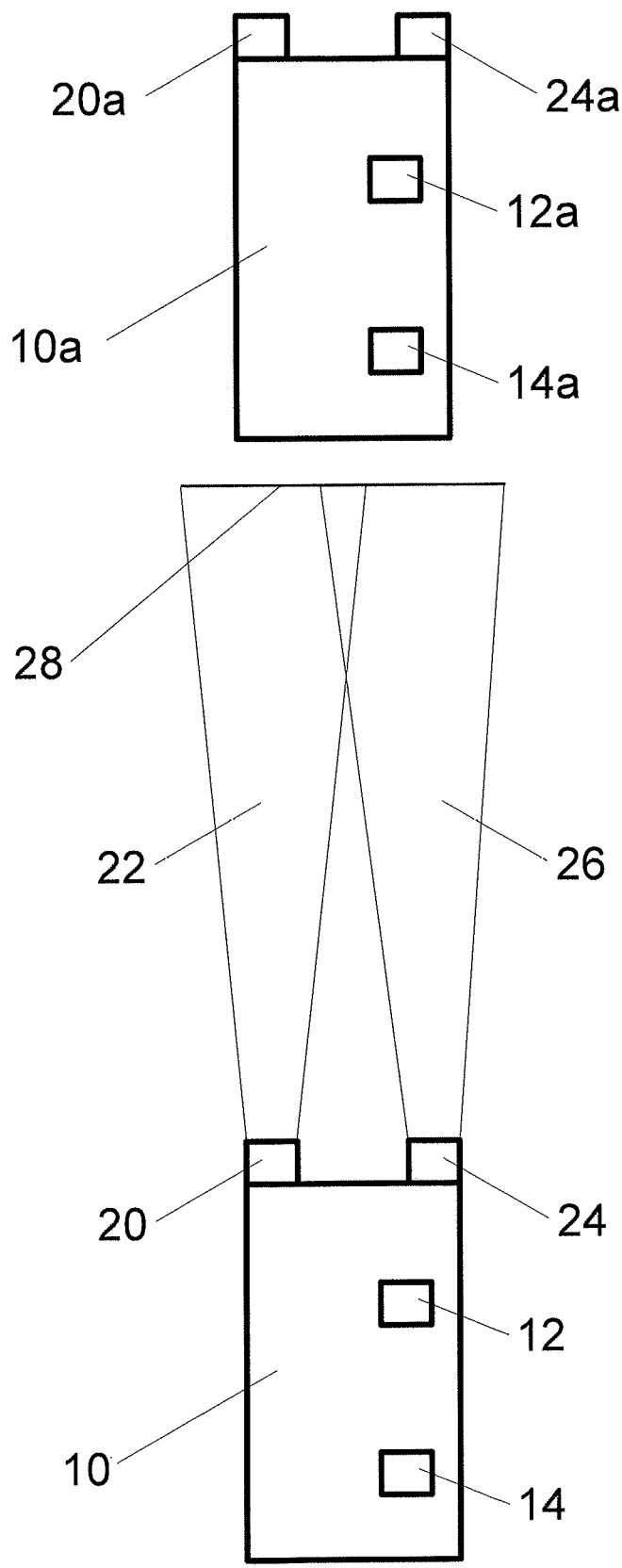
FIG. 1: shows a constellation in which the method according to the invention can be used advantageously for controlling a light range.

FIG. 1 shows a vehicle 10 that comprises an electronic circuit 12 for performing the method according to the invention. For this purpose, the electronic circuit 12 particularly comprises processor means and memory means, wherein program code is stored in the memory means which, if executed, causes the processing means to perform the method according to the invention. The vehicle 10 further includes vehicle-to-X communication means in the form of the communication module 14, which is configured to exchange data with other vehicles and infrastructure facilities. Vehicle-to-X communication as such is generally known, which is why a detailed description is not given here.

The vehicle 10 further comprises a first headlight 20 and a second headlight 24. The first headlight 20 emits a first beam of light 22, whereas the second headlight 24 emits a second beam of light 26. Both beams of light 22, 26 end at a common cut-off line 28.

Another preceding vehicle 10a is traveling ahead of the vehicle 10. The other vehicle 10a also comprises an electronic circuit 12a and a communication module 14a for vehicle-to-X communication. Furthermore, the other vehicle 10a also comprises another first headlight 20a and another second headlight 24a, however their control will not be described here. Accordingly, no beams of light are shown coming from these headlights 20a, 24a.

Both the communication module 14 and the other communication module 14a are equipped with a respective satellite navigation system to detect the respective positions of the vehicles 10, 10a. These positions are sent out in periodic signals, so that other vehicles know the position of the respective vehicles 10, 10a. Satellite navigation also provides a global time reference, which is used by the vehicles 10, 10a for time-stamping the signals to be sent out. In this way, other vehicles that use the same time reference will know at what time the respective vehicle 10, 10a is at what location. This facilitates in particular the calculation of the past route of a respective vehicle 10, 10a.

In the present case, particularly the other vehicle 10a continuously sends out periodic signals that contain the position of the other vehicle 10a at a respective time. Since the communication module 14 in the vehicle 10 includes a satellite navigation system, this vehicle's own position as well as the global time reference used by the other vehicle 10a are known. This makes it possible to calculate the distance between the two vehicles 10, 10a with high accuracy. The light range of the headlights 20, 24 is set based on this distance, such that the cutoff line 28 is immediately behind the other vehicle 10a. This allows for the best possible illumination of the road in front of the vehicle 10 without dazzling a driver of the other vehicle 10a.

Figure 2:
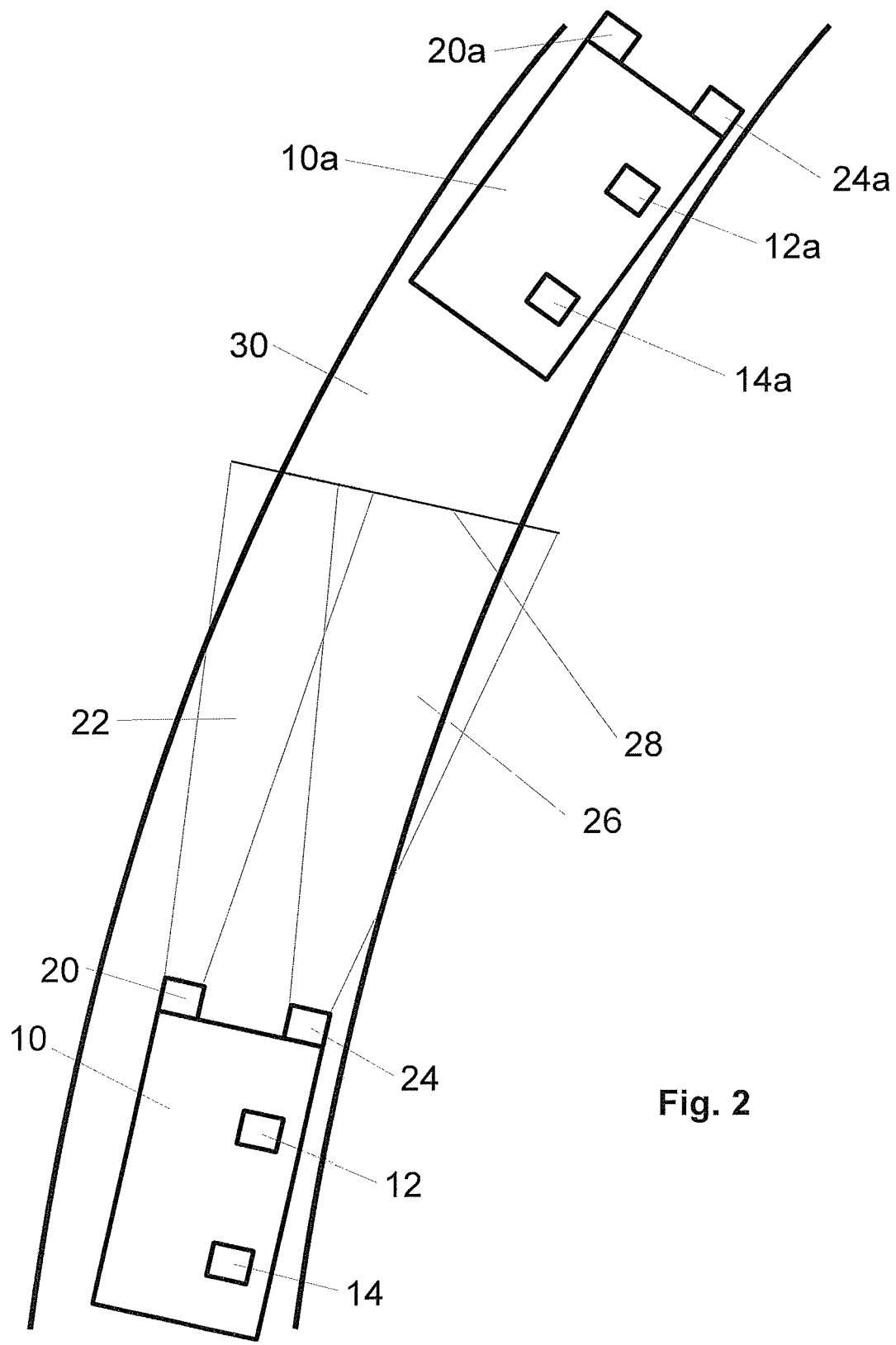
FIG. 2: shows a constellation in which the method according to the invention can be used advantageously for controlling a lighting direction.

FIG. 2 shows the two vehicles 10, 10a in a different constellation. The description of FIG. 1 is referred to for individual components.

In FIG. 2, the two vehicles 10, 10a move along a traffic lane 30. This can, for example, be a traffic lane of a highway. The traffic lane 30, as shown, is not straight but curved, and the vehicles 10, 10a follow that curve.

Using the periodic signals of the other vehicle 10a, vehicle 10 is able to calculate the course of the traffic lane 30 in advance. The electronic circuit 12 of the vehicle 10 is therefore able to control the headlights 20, 24 of the vehicle 10 so that their lighting direction adapts to the course of the traffic lane 30. In the present case, the two beams of light 22, 26 are shifted somewhat to the right to better capture the course of the traffic lane 30. This improves the illumination of the traffic lane 30 and therefore visibility, which helps to avoid accidents.

If over a specific period of time the amount of data available from the vehicle-to-X communication is insufficient for reliably detecting other vehicles or for calculating the traffic lane 30 in advance, the electronic circuit 30 sets the light distribution of the vehicle headlights 20, 24 to a standard of value that matches a classic static low beam light. This avoids dazzling other road users.

The claims included in this application do not represent a waiver of obtaining protection beyond their scope.

If it is found in the course of the proceedings that a feature or a group of features is not absolutely required, the applicant intends to formulate at least one independent claim that no longer includes this feature or group of features. This can for example be the subcombination of a claim existing on the date of filing or the subcombination of a claim existing on the date of filing that is limited by further features. Such claims or feature combinations to be reworded are deemed to be covered by the disclosure of this application.

It should also be noted that embodiments, features, and variants of the invention, which are described in the various embodiments or exemplary embodiments and/or shown in the figures, can be combined with each other in any conceivable form. One or several features can be interchanged as desired. Resulting feature combinations are deemed to be covered by the disclosure of this application.

Backward references in the independent claims should not be interpreted as a waiver of obtaining independent relevant protection for the features of the dependent claims that refer back. These features can also be combined with other features in any conceivable way.

Features that are only disclosed in the description, or features that are disclosed in conjunction with other features only in the description or in a claim, can in principle be of independent significance essential to the invention. They can therefore be individually included in claims for differentiation from the prior art.

The invention claimed is:

1. A method for controlling light distribution of vehicle headlights of a first vehicle, the method comprising:
   receiving, by a receiver of the first vehicle, data from a second vehicle via a vehicle-to-X communication, the data including at least one position of the second vehicle,
   calculating, by a processor of the first vehicle, the light distribution based on this data, and
   adjusting the light distribution to a standard value when during a predetermined period of time, it is determined that:
   a) the received data is insufficient to detect the second vehicle, or
   b) the received data is insufficient to determine a course of a traffic lane on which the second vehicle is traveling.

2. The method according to claim 1,
   wherein the light distribution includes a light range of the vehicle headlights.

3. The method according to claim 2, wherein the light distribution includes a lighting direction of the vehicle headlights.

4. The method according to claim 1,
   wherein the light distribution includes a lighting direction of the vehicle headlights.

5. The method according to claim 1,
   wherein the data at least partially comes from other vehicles.

6. The method according to claim 5,
   wherein the data coming from the other vehicles at least partially contains information about a respective route traveled.

7. The method according to claim 6,
   further comprising calculating a course of the route based on information about the respective routes traveled by the other vehicles,
   wherein the calculated course of the route is used for calculating the light distribution.

8. The method according to claim 7, wherein the data that comes from the other vehicles at least partially includes periodic signals indicating a respective current position of the other vehicle.

9. The method according to claim 6, wherein the data that comes from other vehicles at least partially includes periodic signals indicating a respective current position of the other vehicle.

10. The method according to claim 5,
    wherein the data that comes from other vehicles at least partially includes periodic signals indicating a respective current position of the other vehicle.

11. The method according to claim 10,
    further comprising calculating the course of a route based on the periodic signals,
    wherein the calculated course of the route is used for calculating the light distribution.

12. The method according to claim 11,
    wherein the calculating of a course of the route is performed at least partially by lining up the positions of other vehicles.

13. The method according to claim 12, further comprising detecting oncoming or preceding vehicles using the periodic signals, wherein the position and/or routes of the oncoming or preceding vehicles are used for calculating the light distribution.

14. The method according to claim 11, further comprising detecting oncoming or preceding vehicles using the periodic signals, wherein the positions and/or routes of the oncoming or preceding vehicles are used for calculating the light distribution.

15. The method according to claim 10,
    further comprising detecting oncoming or preceding vehicles using the periodic signals,
    wherein the positions and/or routes of the oncoming or preceding vehicles are used for calculating the light distribution.

16. The method according to claim 1,
    which is performed without using camera data and/or without using map data.

17. The method according to claim 1,
    wherein calculating the light distribution is additionally based on camera data and/or map data.

18. The method according to claim 1,
    which is executed in an electronic circuit.

19. A vehicle, comprising:
    vehicle-to-X communication means,
    an electronic circuit, configured to perform the method according to claim 1, and
    at least one headlight whose light distribution is controlled by the electronic circuit.

20. The method according to claim 1, wherein the electronic circuit is a high beam assist circuit.

* * * * *